Dec. 8, 1953   P. F. BECHBERGER ET AL   2,661,624
AIR SPEED INDICATING DEVICE

Filed Aug. 15, 1949   2 Sheets-Sheet 1

INVENTORS
PAUL F. BECHBERGER
JAMES E. BEVINS
BY
ATTORNEY

Patented Dec. 8, 1953

2,661,624

UNITED STATES PATENT OFFICE 2,661,624

AIR SPEED INDICATING DEVICE

Paul F. Bechberger, Tenafly, and James E. Bevins, Ramsey, N. J., assignors to Bendix Aviation Corporation, Teterboro, N. J., a corporation of Delaware Application August 15, 1949, Serial No. 110,338

3 Claims. (Cl. 73—180)

The present invention relates to indicating and control instruments for aircraft, and more particularly to an instrument for ascertaining movement of an aircraft, such as a helicopter, relative to the surrounding air.

One object of the present invention is to provide an instrument which accurately indicates fluid flow.

Another object is to provide an instrument which readily shows the magnitude and direction of air flow.

A further object of the present invention is to provide an instrument which indicates air flow longitudinally and transversely of the craft to enable the pilot to ascertain the direction of flight of the craft, relative to the surrounding air and to facilitate hovering of the craft in the air.

Another object is to provide an indicator which readily shows the magnitude and direction of air flow longitudinally and transversely of the craft.

Another object is to convert fluid flow of air streams transversely and longitudinally of the craft to electric signals which vary directly with the velocity of the air streams.

Another object is to provide a relatively simple and inexpensive instrument which accurately indicates the magnitude and direction of air flow longitudinally and transversely of the craft.

The invention contemplates an instrument having an elongated tube, an electrical bridge circuit including a pair of thermally responsive resistance elements positioned in the tube and spaced a substantial distance from one another lengthwise of the tube, means closing the ends of the tube, each of the means having an aperture and a nozzle positioned within the aperture and extending therefrom to a point adjacent each of the resistance elements and providing a relatively narrow passage in the tube directed toward the associated element to increase the velocity of the fluid and to direct the fluid in one direction over the associated element without appreciably affecting the temperature of the other element, and means responsive to the bridge circuit to indicate fluid flow through the tube.

The invention also contemplates an instrument having tube-like members disposed at right angles to one another to divide the air stream into two components preferably passing longitudinally and transversely of the craft and a cross-pointer indicator for indicating the magnitude and direction of air flow longitudinally and transversely of the craft.

The foregoing and other objects and advantages of the invention will appear more fully hereinafter from a consideration of the detailed description which follows, taken together with the accompanying drawings wherein several embodiments of the invention are illustrated. It is to be expressly understood, however, that the drawings are for the purposes of illustration and description only, and are not to be construed as defining the limits of the invention.

In the drawings, Figure 1 shows a helicopter mounting an instrument constructed according to the invention.

Figure 1:
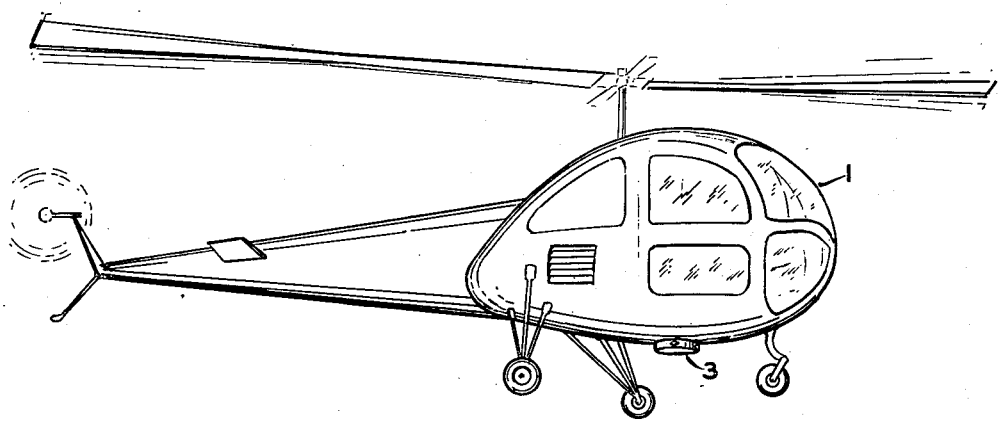

As shown in Figure 1, a helicopter 1 mounts an instrument constructed according to the invention and having a transmitting head indicated generally at 3. The head is shown attached to the lower part of the helicopter, but the head may be mounted on any suitable part of the helicopter. The head shown in detail in Figures 2 to 4 includes a shallow cylindrical housing 5, enclosing a pair of elongated tubes 7 open at their ends and disposed in the air stream at right angles to one another. The tubes extend longitudinally and transversely of the helicopter to divide fluid flow into two components passing lengthwise and transversely thereof.

Figure 4:
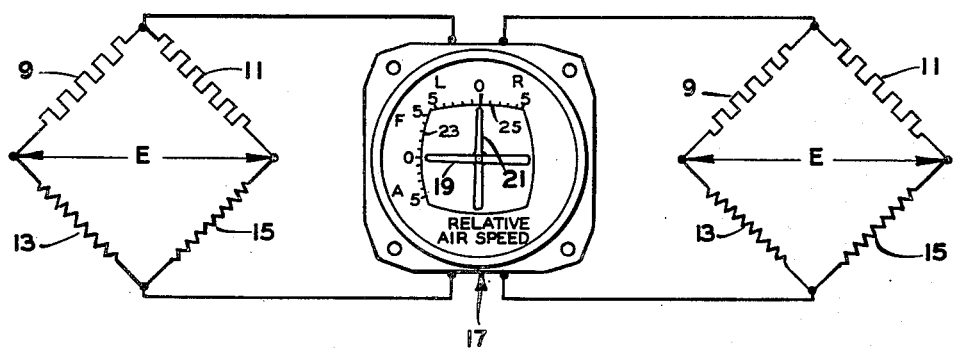
Figure 4 is a schematic circuit diagram of the instrument and shows the cross-pointer indicator.

A pair of thermally responsive resistance elements 9, 11, forming two arms of a Wheatstone bridge, extend transversely of each tube near its ends and are spaced a substantial distance from one another. As shown in Figure 4, a separate bridge circuit is used for each tube and the remaining arms of each bridge circuit are formed by resistors 13, 15. A source of electrical energy E forms one diagonal of each bridge circuit and is connected between element 9 and resistor 13 and between element 11 and resistor 15. A cross-pointer indicator 17, preferably mounted on the instrument panel of the helicopter, forms the other diagonal of both bridge circuits and is connected between elements 9 and 11 and between resistors 13 and 15. The cross-pointer indicator comprises a pair of microammeters mounted in a single casing and having coaxial pointers 19, 21 at right angles to one another and cooperating with scales 23, 25 respectively, which may be calibrated in suitable speed units, such as miles per hour. Pointer 19 is responsive to air flow through the longitudinally extending tube 7, and shows on scale 23 the air speed direction and magnitude longitudinally of the helicopter, and pointer 21 is responsive to air flow through transversely extending tube 7, and shows on scale 25 the air speed direction and magnitude transversely of the helicopter. With this arrangement, the operator of the helicopter can ascertain by a glance at the indicator the direction and rate of movement of the helicopter relative to the surrounding air.

Figure 2:
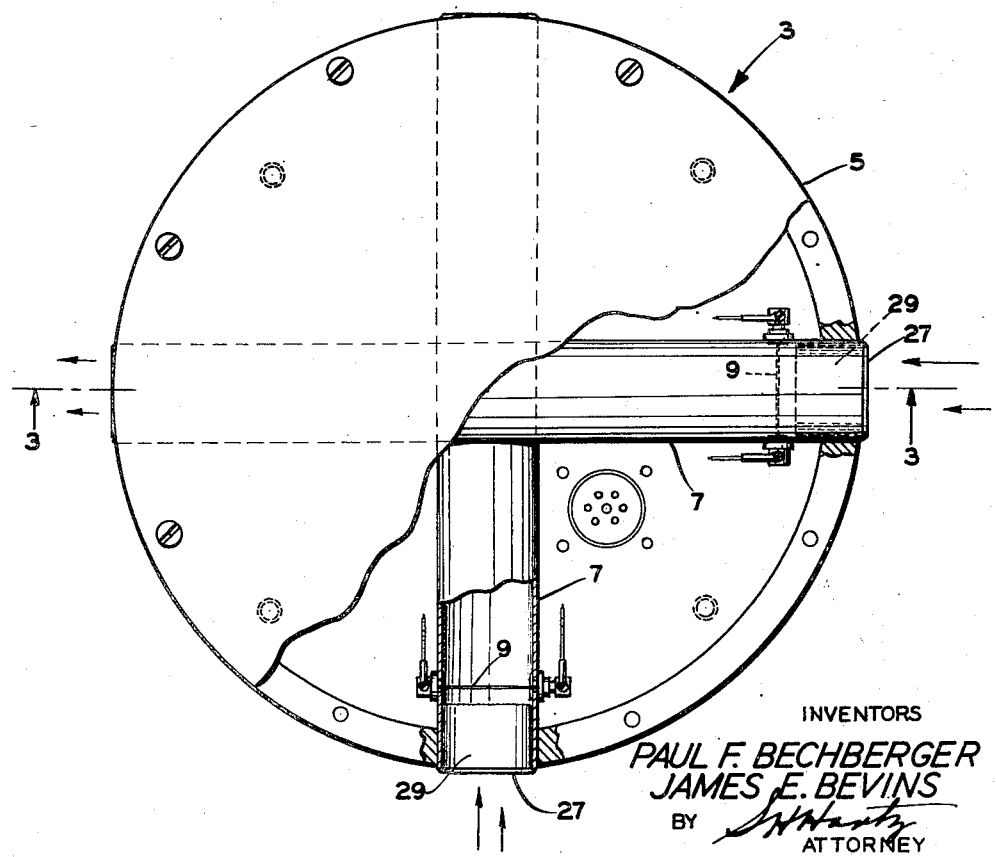
Figure 2 is a top view of part of the instrument with a portion cut away to more clearly show details of construction.
Figure 3:
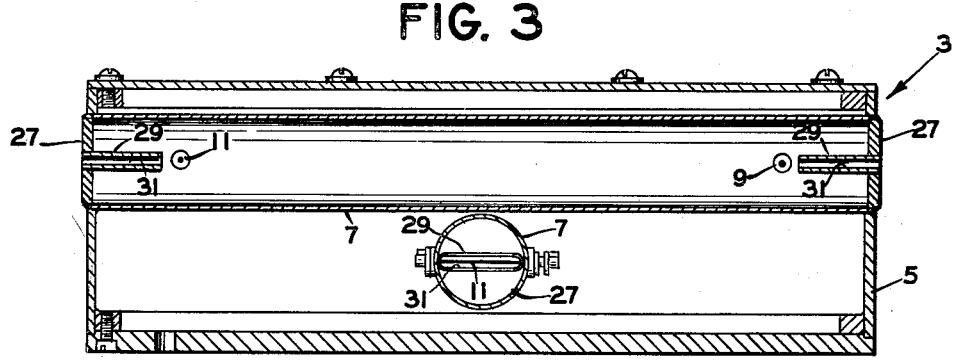
Figure 3 is a transverse vertical section taken approximately on line 3—3 of Figure 2.

As shown in Figures 2 and 3, a pair of closures 27 are closely associated with each element 9, 11 and are positioned between the adjacent outer end of each tube 7 and the associated element. Each closure 27 has an oval tube-like extension or nozzle 29, which provides a relatively narrow longitudinal passage 31 through the end of the tube to increase the velocity of the air stream and the end of the passage is adjacent to the associated element to direct the air stream, as it flows in one direction, on the associated element to cool it. The velocity of the air stream gradually decreases as it passes through the tube after leaving passage 31, so that when the air stream passes the element at the opposite end of the tube, the velocity of the air stream is so low that it does not appreciably affect the temperature of the oppositely disposed element.

The instrument may be used to ascertain movements of a helicopter or other craft in any direction. For example, when air passes in the directions of the arrows (Fig. 2) through tubes 7 as the helicopter moves forwardly and sidewardly relative to the surrounding air, resistance elements 9 are cooled by the air stream emerging from passages 31 and the associated bridge circuits are unbalanced. Likewise, when air passes in the opposite direction through tubes 7 as the helicopter moves rearwardly and sidewardly in the opposite direction, resistance elements 11 are cooled by the air stream emerging from passages 31 and the associated bridge circuits are unbalanced. Pointers 19, 21 of indicator 17 show directly and accurately on scales 23, 25 the speed of the helicopter relative to the surrounding air lengthwise and crosswise of the helicopter.

Figure 5:
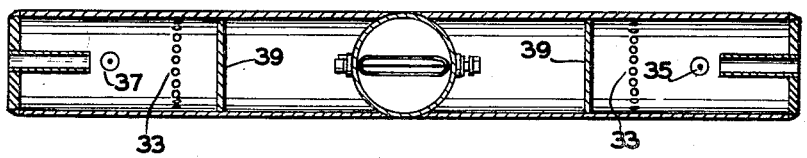
Figure 5 is a view corresponding to Figure 2 and shows another embodiment of the invention.

The arrangement shown in Figure 5 is substantially the same as that shown in Figures 1-4 except that openings 33 are provided in each tube inwardly of each resistance element 35, 37 to provide for air flow from the tube after the air stream passes over the associated element. A transverse wall 39 extends across each tube inwardly of the passages to prevent the air stream, after passing over one of the elements, from passing over the element at the opposite end of the tube. With this arrangement, the air stream from one direction will pass over only one of the elements so that the element at the opposite end of the tube is not cooled by the air stream.

Although several embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the kind described, an elongated tube, an electrical bridge circuit including a pair of thermally responsive resistance elements positioned in said tube and spaced a substantial distance from one another lengthwise of said tube, means closing the ends of said tube, each of said means having an aperture and a nozzle positioned within said aperture and extending therefrom to a point adjacent each of said resistance elements and providing a relatively narrow passage in the tube directed toward the associated element to increase the velocity of the fluid and to direct the fluid in one direction over the associated element without appreciably affecting the temperature of the other element, and means responsive to said bridge circuit to indicate fluid flow through said tube.

2. In a device of the kind described, elongated tubular means adapted to pass fluid therethrough, an electrical bridge circuit including a pair of thermally responsive resistance elements positioned in said means and spaced from one another, there being openings in said means inwardly of said elements to provide for fluid flow from said means after the fluid passes over the associated elements, blocking means across said tubular means inwardly of said openings to provide for fluid flow over said elements in one direction only, and means responsive to said bridge circuit to indicate the magnitude of fluid flow through said tubular means.

3. In a device of the kind described, elongated tubular means adapted to pass fluid therethrough, an electrical bridge circuit including a pair of thermally responsive resistance elements positioned in said tubular means and spaced from one another, means closing the ends of said tubular means, each of said closing means having an aperture and a nozzle positioned within said aperture and extending therefrom to a point adjacent each of said resistance elements and providing a relatively narrow passage in said tubular means to increase the velocity of the fluid as it passes over the associated element, there being openings in said tubular means inwardly of said elements to provide for fluid flow from said tubular means after the fluid passes over said elements, blocking means across said tubular means inwardly of said openings to provide for fluid flow over each of said elements in one direction only, and an indicator responsive to said bridge circuit to indicate the magnitude of fluid flow through said tubular means.

PAUL F. BECHBERGER.
JAMES E. BEVINS.

References Cited in the file of this patent
UNITED STATES PATENTS

| Number | Name | Date |
|---|---|---|
| 1,332,810 | Danielson | Mar. 2, 1920 |
| 1,655,125 | Baule | Jan. 3, 1928 |
| 1,864,638 | Chilowsky | June 28, 1932 |
| 2,136,991 | De Blois | Nov. 15, 1938 |
| 2,255,771 | Golay | Sept. 16, 1941 |
| 2,319,516 | Phelps | May 18, 1943 |
| 2,412,471 | Olson | Dec. 10, 1946 |
| 2,492,371 | Sivian | Dec. 27, 1949 |
| 2,538,843 | McGuire | Jan. 23, 1951 |